UNITED STATES PATENT OFFICE.

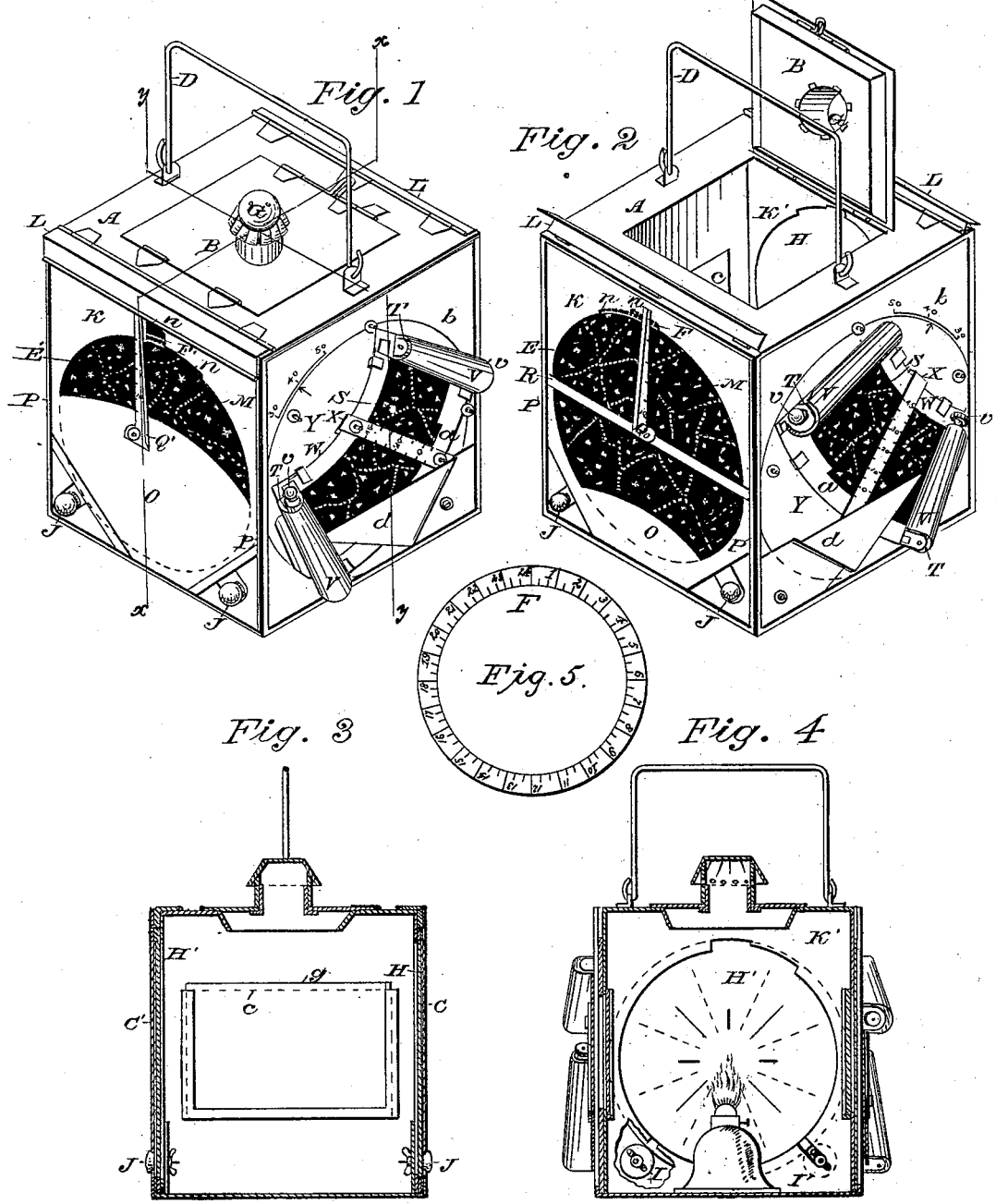

FRANKLIN H. BAILEY, OF HILLSDALE, MICHIGAN.

ASTRAL LANTERN.

SPECIFICATION forming part of Letters Patent No. 247,289, dated September 20, 1881.

Application filed March 11, 1880. (Model.)

*To all whom it may concern:*

Be it known that I, FRANKLIN H. BAILEY, of Hillsdale, Michigan, have invented a new and useful Apparatus for Teaching Astronomy, which I designate an "Astral Lantern," of which the following is a specification.

The object of this invention is to facilitate the study of astronomy by furnishing the student with an instrument that shall accomplish the work of an atlas of the heavens, celestial globe, planisphere, and lantern for either day or night use.

My invention consists of an apparatus for teaching astronomy, which I designate an "astral lantern," the same having adjustable maps of the heavens and other devices, all of which will be fully understood by the following description:

The advantages claimed for it are the ease and accuracy, and consequent saving of time, in finding the constellations and locating the stars and following them in their courses; also, the great saving to the eye in night use, in being able to see the maps with all their stars, boundaries of constellations, and names by means of transmitted light, so as not to affect the pupil of the eye, and in day use having a miniature heavens, seen by reflected light, presenting the stars in correct relative positions precisely as they would appear in the heavens if visible.

Without moving the instrument when properly set, the student, by changing his position, sees a map of that part of the heavens which he faces, and with its stars all in the same relative positions as those in the real heavens, the different magnitudes indicated and names of principal stars given, the constellations bounded and names given, and every map adjustable to every minute of time and every latitude north of the equator, and by very simple mechanical movements each map is made to revolve or roll to keep exact pace with the apparent movement of the stars. Thus the student is enabled to learn from this apparatus alone not only the names of the stars and constellations, but their exact positions in the heavens at each minute and their exact movement, to tell the exact time of night, the latitude of his position of observation, the exact time for the rising, culmination, and setting of each star, its right ascension and declination or polar distance. I attain these objects by the mechanism illustrated in the accompanying drawings, of which—

Figure 1 is a perspective view showing the top and sides, designated "northern" and "western," of instrument. Fig. 2 shows top with doors open, southern and eastern sides. Fig. 3 is a vertical sectional view on the lines $x\ x$, Fig. 1, through the northern and southern sides; and Fig. 4, a vertical sectional view on the lines $y\ y$, through the eastern and western sides. Fig. 5 is a detached view of the time-dial.

The instrument is provided with artificial light for night use, and door B, gas-escape G, and bail D. Its sides contain, respectively, maps of the northern, eastern, southern, and western heavens, mounted and described as follows: The northern and southern heavens, each being a circular map, E E', fastened to or otherwise placed on glass disks C C, Fig. 3, a little larger than the map, and having near its margin the date at which each part of the map should be uppermost at twelve o'clock m., and by means of which it is adjusted to the time-dial F, Fig. 5, by bringing under XXIV on the dial, said time-dial being upon the margin of another glass disk, H H', Figs. 2, 3, and 4, of the same size as the one carrying the map. Both glass disks revolving together upon friction-rollers I, Fig. 4, by means of thumb-pieces J, the map is set for any hour or minute of the day by bringing the time at which it is desired to set it into the slot $n$, over the map in plate K. The glass disks carrying the map and time-dial are held in place in the sides of the lantern by means of two plates, K, Figs. 1 and 2, and K', Figs. 2 and 4, with circular openings M, through which the map is visible, said plates being provided with adjustable horizons O, sliding in grooves P, and perforated pivoted indicators Q Q', on a bar, R, sliding also in said grooves, for showing right ascension and declination or polar distance.

Each of the eastern and western sides has a rolling printed or written map, S, in the form of a portion of the sector of a circle, between two concentric arcs of unequal radii, mounted on frustums of cones T, with thumb-screws $v$, for revolving the same, inclosed in sheaths V, in combination with glass plate W, with a perforated sliding indicator, X, for showing right ascension and declination or polar distance, and revolving disk Y, provided with handles, and having opening of same form as map, provided with slot $a$ in larger curvature for showing date, said disk revolving against a plate, $b$, having a rectangular opening, $c$, Fig. 3, covered with ground glass $g$, Fig. 3, and provided with a stationary horizon, $d$.

The map of the northern heavens embraces that portion containing the visible stars within a radius of fifty degrees of the pole, and the map of the southern heavens that portion containing the visible stars within ninety degrees of the pole.

The remaining portions, together with five degrees of both the northern and southern heavens, is embraced in both the eastern and western maps.

Instead of the maps being revolved by hand, clock-work may be employed for that purpose.

In operating my invention, I place the lantern square with the points of the compass, with the map of the northern heavens facing the south; select northern and southern horizons corresponding with the latitude of observation, and place them in the appropriate grooves; loosen the screws at top of disks on eastern and western sides; revolve the disks until their arrows point toward the figures indicating the correct latitude; revolve the maps on the northern and southern dial-plates until the date appears directly under IX, p. m.; turn thumb-screws until the time of observation or time of study in either day or night appears under notches in slots at top of openings; roll the eastern and western maps by means of the thumb-screws on ends of rollers until the correct date appears at lower end of slots in plates. The maps will then be set for nine o'clock, p. m. If the time of observation or study is earlier than nine o'clock, roll the maps backward, and forward if the time is later, at the rate of fifteen degrees per hour. The lantern being thus set, the observer compares the real with the miniature heavens, and is thereby enabled to readily apply to the stars and constellations the names they bear upon the maps.

By revolving and rolling the maps he is enabled to keep the stars and constellations in the miniature in the same relative positions as they appear in the real heavens, and by reference to the dial on margin of map of either the northern or southern heavens can determine the exact time.

The pivoted indicators can be used to determine right ascension, declination, or polar distance, and time of culmination of the stars. Right ascension is read by reference to figures on inner margin of maps, declination or polar distance by reference to figures on indicators, and time of culmination by figures on dial under indicator when placed perpendicularly with edge over notches in slots.

To determine right ascension and declination or polar distance of stars on eastern and western maps, I place the sliding indicator on glass plate with either edge, as the case may be, over star and corresponding figures on both margins, which, by means of the straight-edge indicator, will show the right ascension or declination sought for.

Having described my invention, what I claim is—

1. In an apparatus for teaching astronomy, the frustum-rollers T, for the purpose of rolling and adjusting the map S, substantially as specified.

2. The revolving disk Y, in combination with the map S and rollers T, substantially as set forth.

3. The annular revolving time-dial F F', mounted as described, in combination with the revolving circular maps E E', of glass or other translucent material, substantially as set forth.

4. In an apparatus for teaching astronomy, the series of exchangeable horizon-plates O, substantially as specified.

5. The slots $n$, in combination with the revolving maps E E', for the purpose of indicating the time on the dial, substantially as set forth.

6. In an apparatus for teaching astronomy, the rollers I and frustums of cones T T, for the purpose of revolving the maps of northern and southern and of eastern and western heavens, respectively, substantially as set forth.

FRANKLIN H. BAILEY.

Witnesses:
DANIEL BREED,
JUDSON S. BROWN.